United States Patent [19]

Fenton

[11] Patent Number: 4,806,061
[45] Date of Patent: Feb. 21, 1989

[54] TRAILER AND TRAILER UNLOADING SYSTEM

[75] Inventor: E. Dale Fenton, Columbia, Mo.

[73] Assignee: Automation Sales, Inc., Hammond, Ind.

[21] Appl. No.: 908,821

[22] Filed: Sep. 18, 1986

[51] Int. Cl.$^4$ ............................................... B60P 1/04
[52] U.S. Cl. .................................. 414/475; 414/483; 414/498; 414/529; 280/656; 280/149.2
[58] Field of Search ............... 414/475, 480, 484, 482, 414/483, 474, 498, 529; 280/80 B, 43.16, 656

[56] References Cited

U.S. PATENT DOCUMENTS

| | | |
|---|---|---|
| 1,509,530 | 9/1924 | Shirreff . |
| 2,717,707 | 9/1955 | Martin . |
| 2,753,064 | 7/1956 | Lesser . |
| 2,859,889 | 11/1958 | Love ................................... 414/475 |
| 3,606,059 | 9/1971 | Haberle, Jr. . |
| 3,934,740 | 1/1976 | Rumell . |
| 4,125,198 | 11/1978 | Landoll . |
| 4,568,235 | 2/1986 | Bills, Jr. . |
| 4,599,040 | 7/1986 | Rasmussen ..................... 414/529 X |

FOREIGN PATENT DOCUMENTS 516562  1/1940  United Kingdom ................ 414/480

Primary Examiner—Frank E. Werner
Attorney, Agent, or Firm—Richard G. Kinney

[57] ABSTRACT

A trailer unloaded onto the ground or like surface using an unarticulated frame and no power sources other than the tractor or prime mover. The frame supports three rows of overlapping transverse rollers and has a tail-end roller substantially across its width. A wheeled carriage is mounted to the underside of the frame, so that it can be longitudinally shifted. When mounted on a conventional "fifth wheel" connection to the tractor, shifting of the carriage forward lowers the tail end of the frame which pivots downward about the connection to the trailer. Shifting the carriage back raises the tail. A pair of ground rollers is provided at the tail of the trailer which contacts the ground as it is lowered. A load may be placed onto the ground by unlocking the carriage, applying the brakes to the wheels of the carriage and backing up the tractor-trailer. When the trailer end is lowered so that the ground rollers are on the ground, the trailer is stopped, the load is unstrapped, and the tractor trailer driven forward, out from under the load which is thus placed on the ground. Thereafter, by applying the carriage brakes again while driving the rig forward, the frame is returned to its raised tail position, the carriage relocked, and the unloaded rig can be driven on the road.

9 Claims, 3 Drawing Sheets

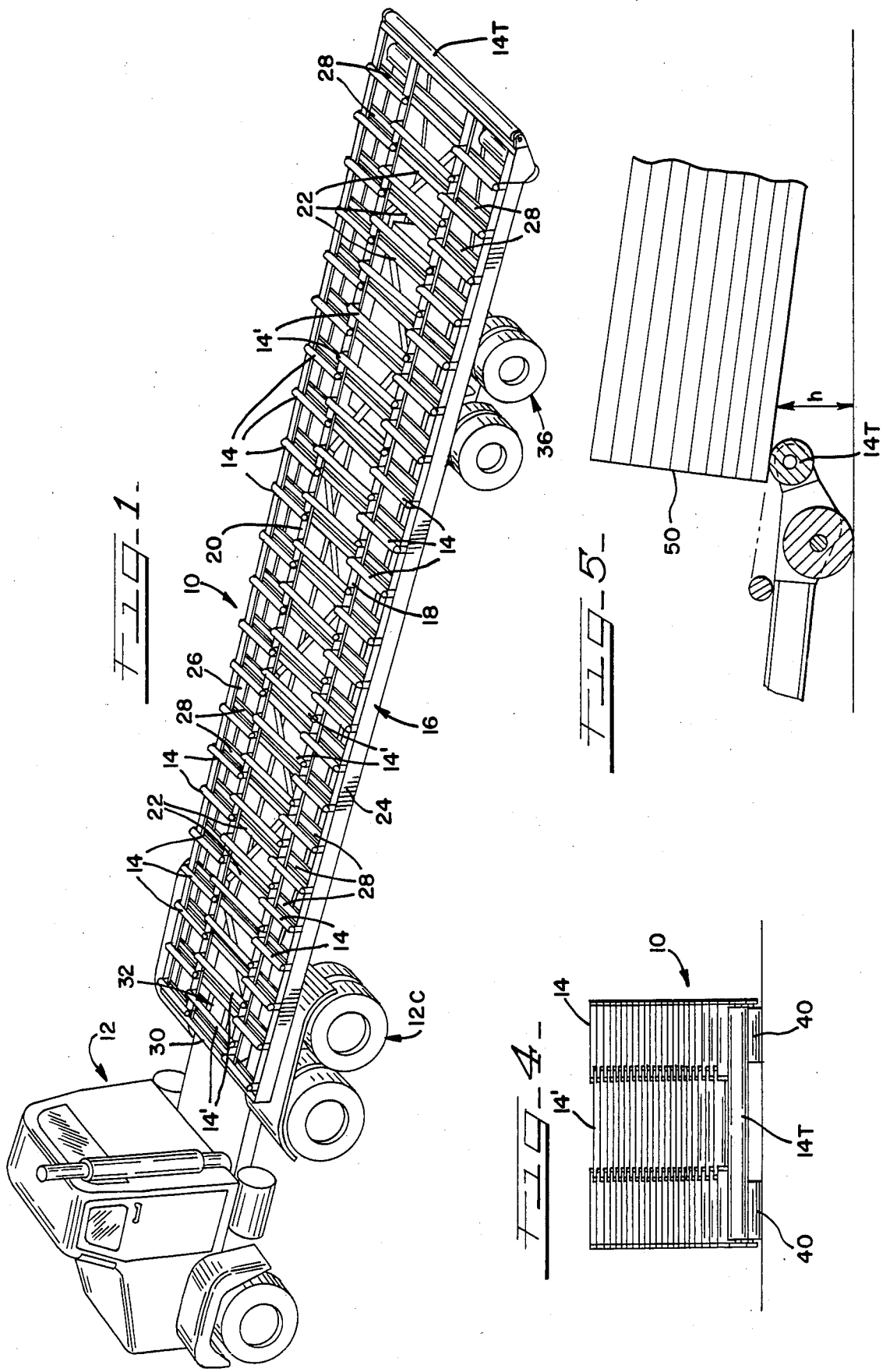

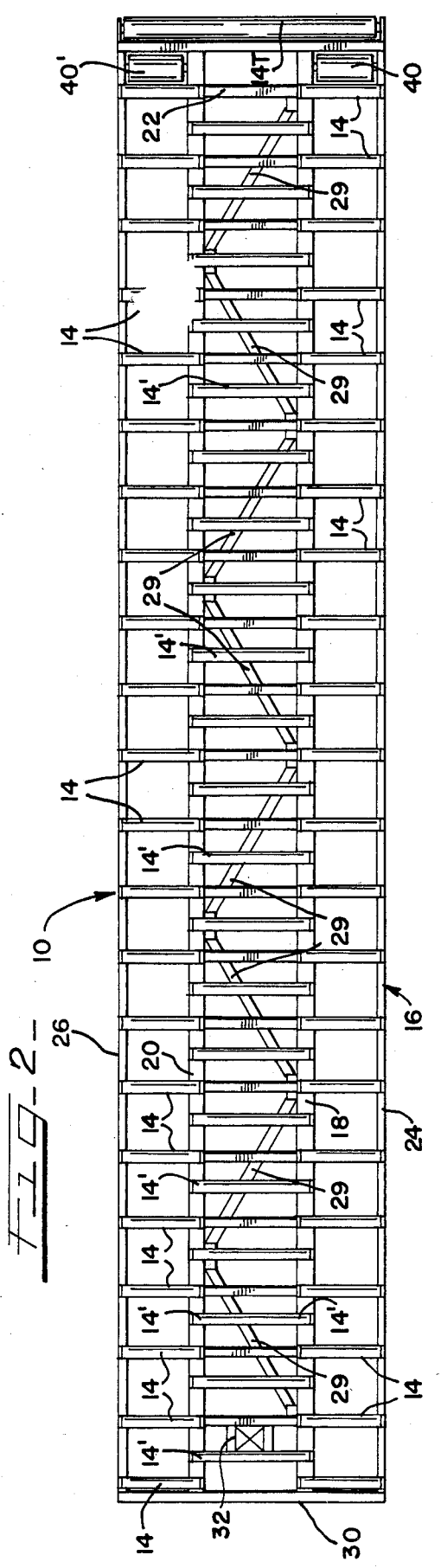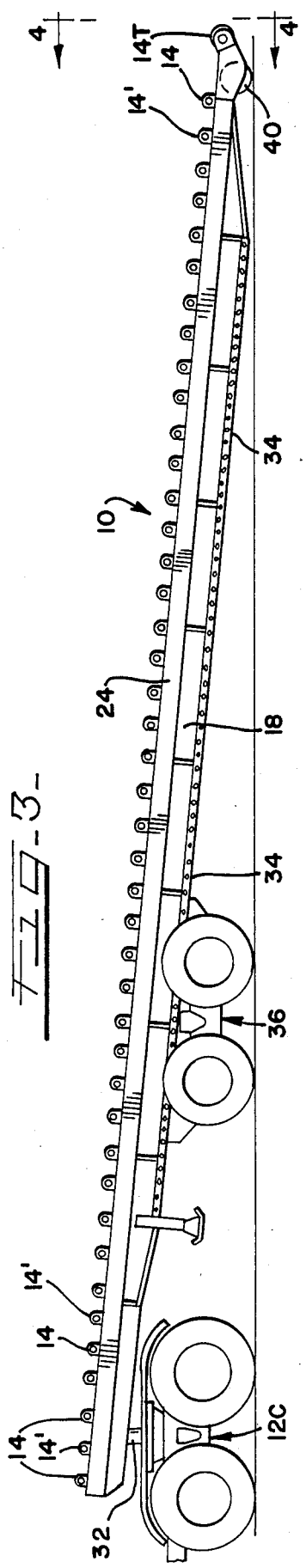

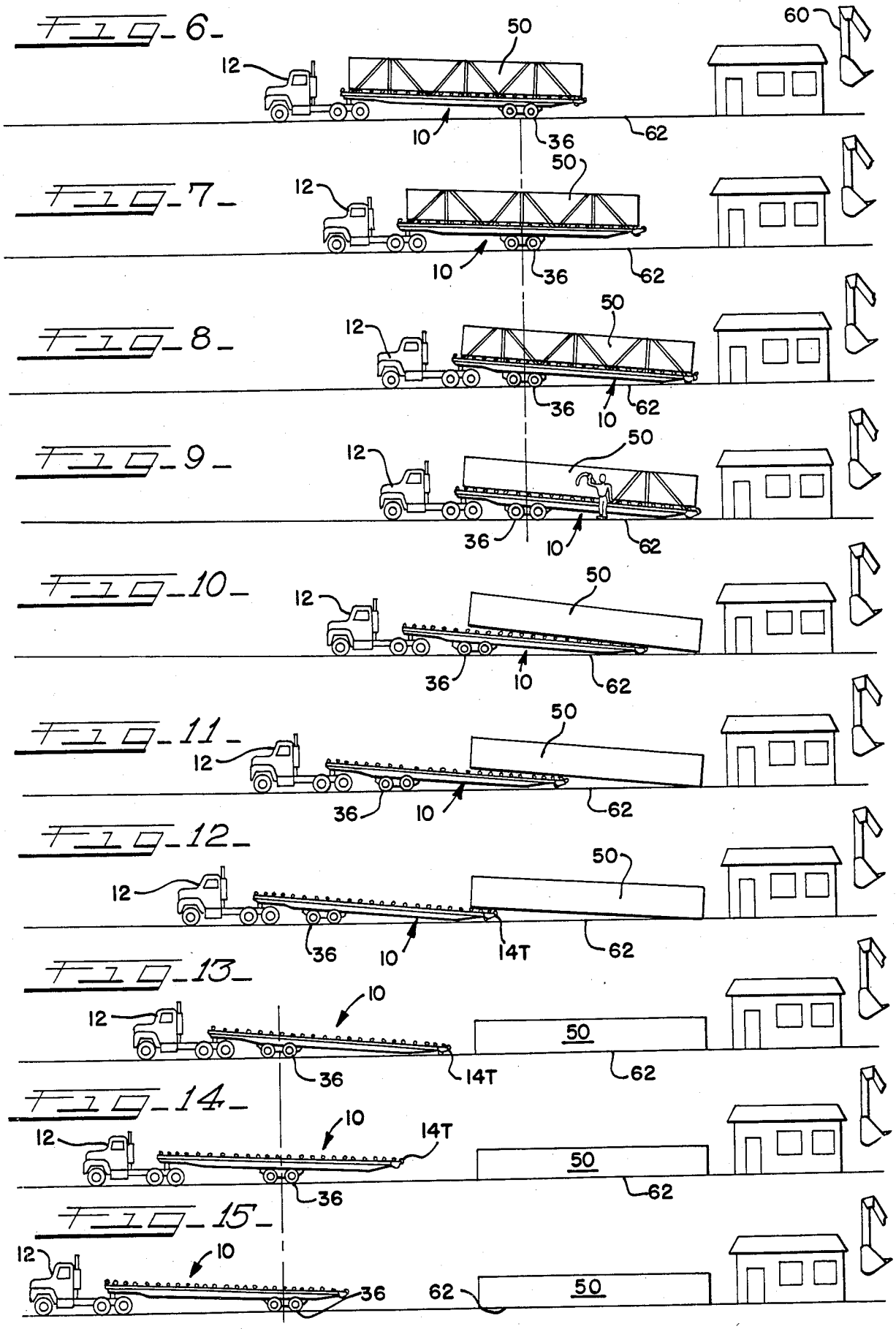

TRAILER AND TRAILER UNLOADING SYSTEM

FIELD OF THE INVENTION

This invention relates to transport trailers and is especially concerned with a trailer uniquely adapted to unload onto the ground large loads such as bundled building trusses.

BACKGROUND OF THE INVENTION

When shipping goods to construction sites, especially large loads such as bundled building trusses, there are unloading problems. If a special "cradle" truss trailer or a conventional flatbed trailer is used, on-site equipment such as a crane or forklift must be available to unload the trailer. Because of scheduling difficulties, often such equipment is not ready when the trailer and its load arrives at the site. The equipment needed to unload the trailer may be busy with other more urgent tasks or it may not have yet arrived at the site itself. In such circumstances, the truck driver has to choose between waiting (perhaps for hours) for the equipment to unload his trailer to be available or going about other tasks and returning later.

In either case, the result is a costly loss of equipment use time and driver time.

To overcome this problem, it has been proposed to make trailers with a bed of rollers and to unload by untying the load and "jerking" the trailer forward and, hopefully, rolling and dropping the load on the ground off the rear of the trailer. However, this involves subjecting the load to a drop of at least two feet off the tail or back edge of the trailer. While some loads can take such abuse, others are damaged in the process.

Tilting trailer beds have been successfully used with drive-off equipment. U.S. Pat. Nos. 4,125,198; 2,717,707; 4,568,235; and 2,717,707 are examples of such trailers. Such trailers are not well suited for unloading loads which cannot be driven off of the trailer. A similar principle has been used for unloading containers. For example, U.S. Pat. Nos. 3,934,740 and 3,606,059. However, all such tilting-bed trailers require extra power units, such as hydraulic rams and often a winch. The latter two examples also require specialized containers which must be unloaded and picked up later. Thus, these are not suitable for use in unloading a "one-way" item such as a bundle of building trusses. Such prior trailers also require special articulated pivoting sections and special controls to operate the power units so as to articulate the various sections. These controls, extra power units, and articulated sections increase the initial cost and complexity of the trailer, require special tractors or power mover units, and are prone to wear and break down, with the consequential increase in maintenance costs and down-time.

SUMMARY OF THE INVENTION

In contrast to these prior art trailers, a trailer constructed in accordance with the principles of the present invention may be used with any conventional over-the-road tractor or prime mover unit, need not have any special controls nor any extra power unit such as the hydraulic rams or winches used before, and has no articulated frame bed sections.

A trailer constructed in accordance with the principles of the present invention includes a wheeled carriage which when unlocked can be shifted longitudinally relative to the trailer's frame by simply applying the brakes to its rear carriage wheels while driving the tractor forward or backward. (This requires no modification to the tractor, since such brakes are conventionally controlled separately in tractor-trailer rigs to prevent jack-knifing.) The mounting of the carriage to the frame is such that shift of the carriage causes the frame to pivot at its connection to the tractor unit. (For a long bed (45 foot) trailer, this connection may be entirely conventional, since such connections already allow for a range of vertical pivoting of the trailer—to accommodate hills and bumps.)

By this simple, unpowered arrangement, the tail of the trailer may be lowered to the ground. The trailer frame is so constructed that the tail end contacts ground first and means, e.g., a pair of large-diameter rollers, are there provided for contacting and moving the trailer end over the ground in its tail-down configuration.

The trailer preferably has a bed of rollers and is slanted so that when the trailer is in this tail-on-ground state, the load can be unstrapped and unloaded by moving the power unit forward out from under it. With large loads, such as bundled building trusses, once the rear-end of the load contacts the ground, the load itself tends to propel the trailer out from under it. The final "drop" of the front end of the load off of the tail-down trailer is only a few inches. This means little or no unloading damage to the freight.

Unlike prior trailers, the present trailer is designed to and does roll along the ground on its tail-end rollers during the unloading process. The provision of such ground-contacting rear rollers prevents the tail end from tearing up the ground surface (e.g., an asphalt parking lot next to a building site).

Other features and advantages of the invention will become clear from the following description and claims.

The invention, together with the advantages thereof, may best be understood by reference to the following description taken in connection with the accompanying drawings, in the several figures of which, like reference numerals identify like elements.

BRIEF DESCRIPTION OF THE DRAWINGS

FIG. 1 is a perspective view of a trailer constructed in accordance with the principles of the present invention.

FIG. 2 is a top or plan view of the trailer of FIG. 1.

FIG. 3 is a side or elevational view of the trailer of FIGS. 1 and 2 in its tail-down configuration.

FIG. 4 is an end view of the trailer of FIGS. 1-3 as seen from the line 4—4 in FIG. 3.

FIG. 5 is a sectional view as seen from the line 5—5 of FIG. 4, with a load shown in the process of being unloaded.

FIGS. 6 through 15 are each side views on a reduced scale of a conventional tractor and the trailer of FIGS. 1-4 with a load, showing successive steps in the unloading process at a building site. These views are especially useful in illustrating the distinctive manner of unloading of the present invention.

DETAILED DESCRIPTION OF A PREFERRED EMBODIMENT

Referring now to the drawings and especially FIG. 1, there is depicted a trailer constructed in accordance with the principles of the present invention and generally designated by the number 10. The trailer 10 is shown in FIG. 1 in its over-the-road configuration, coupled to a conventional tractor or prime mover unit 12.

The trailer 10 is of the flatbed type but has a "bed" comprised of a set of rollers 14, 14., all of which are in the same plane as better shown in FIG. 3, and are supported on a frame 16. The frame 16 includes a pair of main longitudinal members or beams 18, 20 which run parallel to one another at an equal distance from the longitudinal center line (about one-quarter of the trailer width) of the trailer. A number of cross members 22 are connected between the main members. The frame 16 also includes a pair of side members 24, 26 which are connected to the main member by a series of short cross members 28. The short cross members 28 may be formed as unitary extensions of the cross members 22, in which case, the main members 18 and 20 are cut to receive them, and they are then welded in place to those members. The frame 16 includes a front cross member 30 and has a conventional trailer-tractor connector unit 32 including a conventional kingpin for connecting to the conventional tractor unit 12. This unit 12 is sometimes termed a "fifth wheel" in this art.

As best shown in FIG. 2, the frame 16 is open and the rollers 14, 14'. are staggered, with the outside rollers 14 being somewhat shorter than the center rollers 14'. Three sets or rows of rollers are thus provided. The use of staggered rollers and shorter than full-width rollers (as is commonly done in prior roller bed trailers) provides better support and less bending of the rollers under load. It should be noted that the outside rollers 14 overlap the ends of the center rollers 14'to leave no part of the transverse extent of the trailer load surface unsupported.

As is also shown in FIG. 2, the frame 16 includes triangular bracing members 29, as is conventional for flatbed trailer frames. The tail end of the trailer 10 is formed by a single large roller 14T which does extend across the width of the trailer. As will be explained below, this is the last roller which contacts and supports a load during unloading and thus is constructed in a substantial manner so as to support up to half or more of the expected load during the unloading process.

As best shown in FIG. 3, the main frame members 18, 20 are shaped to taper toward the tail and also each support on their bottom a track 34 which is part of the mounting for a tandem-wheeled carriage 36. The carriage 36, itself, may be entirely conventional and thus need not be described in detail. It may be, for example, the carriage currently commercially available and known as a hitch sliding axle, single leaf spring carriage employing 5" round Rockwell brand #TKN4670-Q axles with Stenco brand grit guard oil sales and 12½×8⅜ non-asbestos brakes. Such units conventionally include rollers for contacting a flat surface of the track 34 and manually-releasable locking pins that project into holes in the track. The height of the carriage 36 is less than that of a conventional drive wheel carriage 12C (FIG. 3) of a conventional tractor 12. Thus, the trailer "bed" of rollers 14, 14', 14T slants rearward slightly in the over-the-road configuration. That is, the longitudinal frame upon which the under-carriage 36 is mounted is always inclined downward from the forward end to the tail, relative to the plane (labeled 62 in FIGS. 6–15) defined by the ground contact points of the wheels of the carriage 36 and of tractor 12.

Unlike conventional trailers which often allow a limited shift in their carriages, the track or slide rails 34 extends for a considerable portion of the length of the frame 16, and the carriage may be shifted along the truck from the position shown in FIG. 2 to that of FIG. 3. The construction of the frame members and the height of the carriage 36 relative to that of the connector unit 32 causes the frame 16 to pivot downward about the unit 12 to allow its tail to contact the ground.

Although a double-axle carriage unit 36 is shown and described, another prototype using a single-axle unit has been built and tested and also shown to work well. The use of a double-axle unit allows for a greater load-carrying capacity and thus is currently preferred.

A novel arrangement is provided for contacting and moving the tail on the ground. This is a pair of rollers 40, one on each side of the tail just forward and below the last roller 14R. These ground rollers 40 are, as shown in FIG. 4, situated between the main frame members 18, 20 and the outer side members 24, 26 and project below the level of the frame 16. As explained below, during the unloading process, these rollers and the main tractor unit 12 provide the support for the trailer 10 and its load, and thus it is desirable to place these rollers at the tail end of the trailer 10. (Although they could be placed further toward the front, if desired, just so long as they contact the ground first when the carriage advances and sufficient support is provided to the tail roller 14R and the tail to prevent it from bending down and contacting the ground.)

As shown in FIG. 5, the height "h" of the roller 14T off of the ground when the trailer is in its tail-down position is much less than the over-the-road height. In a 45', -long trailer prototype, this is only 12 inches above a flat unloading surface. For a long load (such as the trusses 50 shown in FIG. 5 and FIGS. 6–15), the effective drop is less than even this height, since its other end is already on the ground, its center of gravity typically drops only half of this distance. For wood trusses and like loads 50, this has been demonstrated to be entirely acceptable (being typically less of a shock than the conventional drop by a typical crane operator) and to not result in any damage to the load.

FIGS. 6 through 15 illustrate the successive steps in unloading a load of trusses 50 from the trailer 10. In FIG. 6, the tractor 12 with a loaded trailer 10 has arrived at a building site. As is often the case, the equipment 60 and personnel which might be used to unload the trailer 10 are not readily available. With conventional cradle or flatbed trucks, the driver would have to wait or come back again. With a prior art rolled bed truck, the driver could attempt to "jerk" and drop off the load several feet and risk load damage. With the trailer 10, the driver need only align and point the tail of the trailer toward an area, such as the area 62 where it is desired to leave the load 50. He then unlocks the carriage 36 and, as shown in FIG. 7, applies the brakes to its wheels while backing up the tractor 10. This lowers the tail end to have the tail rollers 40 contact the ground (FIG. 8).

The driver can back up or move forward the trailer in this arrangement so as to "place" the load almost exactly where he wants it. When so placed, he removes the straps (FIG. 9) and then drives the rig 10–12 forward from a standing stop. The natural inertia of the load causes it to tend to remain in place, and the trailer 10 rolls out from under it. In some cases, some forward momentum may be transferred to the load, but in any case, as soon as the load makes contact with the ground, that contact tends to brake and hold the load from going forward. (FIG. 10)

The load 50 then actually propels or pushes the trailer forward (FIGS. 11 and 12) until the forward end of the load 50 rides over the tail roller 14T and drops to the ground (FIG. 13).

At this point, it should be noted that, contrary to prior art pivoting trailers, the trailer 10 has run on the tail rollers 40 on the ground for a considerable distance.

The driver may next apply the brakes to the wheels of the carriage 36 while driving forward (FIGS. 13 and 14) to raise the tail and return the trailer to its over-the-road state. He then stops and re-locks the carriage 36 in place and drives off to pick up a new load (FIG. 15).

This entire unloading process can be done by one man, the truck driver, in as little as ten minutes.

A prototype trailer was constructed substantially in accordance with the drawings. This trailer was tested and shown to perform well.

For purposes of definiteness and not limitation, the following details of the prototype are given, it being understood that the principles of the invention may be incorporated into many variations. Also, the inventor and his firm may choose to make changes in the future from the following, for reasons of economy or as experience may indicate are desirable.

The prototype was about 45 feet long, with side members 24, 26 formed of 1¾-inch by 6-inch steel channels. The main members 18, 20 were about 45-feet-long specially-fabricated I-beams substantially as shown, with a 6-inch wide top and bottom and being a maximum height of 19 inches. The cross members 22, 28 were formed of 4-inch Jr. I-beams. The rollers 14 were 47-inch long rollers, 2 inches in diameter, supported by LPR Westron brand end supports, with longitudinal and transverse bracing. The rollers 14', were 24 inches long and 2 inches in diameter and similarly supported. Both rollers 14 and 14'. employed section 80 steel machine tubing at their outer surfaces. The roller 14T was 7 inches in diameter. The rollers 40 were 12 inches in diameter. The carriage 36 was that previously identified.

The track 34 was formed of conventional track material for such a carriage but was made 26 feet long by adding an extension of 11 feet to the front of the conventional track.

The brake air hose for the carriage was run between the members 28, 20, and three 36-inch coil springs used to hold the hose in position and so as to prevent it from tangling or kinking as the carriage moves relative to the frame.

Conventional lighting and conventional front supports for the trailer for use when the trailer is not connected to a tractor were employed as shown in the drawings.

The conventional trailer connector stands at about 34 inches off the ground, so with the carriage 36 being about 17 inches high, the over-the-road pitch of the rollers 14, 14', 14T was about three degrees from the horizontal when on flat ground. When in its tail-down configuration (FIG. 3), the pitch is about seven degrees to the horizontal.

While one particular embodiment of the invention has been shown and described, it will be obvious to those skilled in the art that changes and modifications may be made without departing from the invention and, therefore, the aim in the appended claims is to cover all such changes and modifications as fall within the true spirit and scope of the invention.

I claim:

1. A trailer for use by a prime mover unit for unloading a load on the ground, the prime mover unit having means for receiving a trailer connection which connection receiving means is maintained at a substantially fixed height above the ground as the prime mover moves over the ground, comprising:

a longitudinal frame having a tail end and a forward end, said longitudinal frame being always inclined downward from the forward end to the tail end;

means on the forward end of said frame for connection to the prime mover unit and allowing a tilt upward and downward of the frame therefrom;

a wheeled under-carriage mounted to said frame so as to be shiftable longitudinally along said frame, said frame and said under-carriage being so arranged that a longitudinal shift of said under-carriage in one direction tilts said frame downward from said forward end connection means to the prime mover and lowers the tail end to the ground level, while the reverse shift tilts said frame upward from said forward end connection means to the prime mover and raises the tail end to an over-the-road height, said under-carriage having brakes which are connected to be controlled from the prime mover independently of the prime mover's brakes, and means near the tail lend of said frame for contacting the ground and for moving on the ground when the tail lend is lowered to the ground, whereby the tail end may be lowered to the ground and raised therefrom solely by applying the brakes of said under-carriage while moving the prime mover and said frame relative to said under-carriage, and the trailer moved along the ground on said tail-end ground contacting means.

2. The trailer of claim 1, wherein said frame is not articulated and supports a bed of rollers upon which a load may be releasably secured, whereby the load may be aided in its unloading by rolling on the rollers.

3. The trailer of claim 2, wherein said ground-contacting means includes at least one roller element which may roll on the ground when said frame is in its tail end down position.

4. The trailer of claim 3, wherein means are provided for releasably locking said wheeled under-carriage in a position wherein the tail end of the frame is up.

5. The trailer of claim 4, wherein said bed of rollers lies in a plane which is angled downward from the forward end to the tail end when the trailer is connected to a standard over-the-road tractor as said prime mover and that plane is pivoted downward when the frame assumes its tail-end down configuration.

6. The trailer of claim 5, wherein said means for connecting to the prime mover is connectable to a conventional fifth wheel connector of the tractor.

7. The trailer of claim 4, wherein said wheeled under-carriage is shifted to a rearward position to raise the tail end of the frame and is releasably lockable to the frame in such position.

8. The trailer of claim 2, wherein said bed of rollers are transversely positioned and provided in longitudinal rows which are so positioned as to transversely overlap each other.

9. The trailer of claim 8, wherein said bed of rollers includes a tail-end roller which extends substantially across the width of the trailer.

* * * * *

UNITED STATES PATENT AND TRADEMARK OFFICE
CERTIFICATE OF CORRECTION

PATENT NO. : 4,806,061
DATED : February 21, 1989
INVENTOR(S) : E. Dale Fenton

It is certified that error appears in the above-identified patent and that said Letters Patent is hereby corrected as shown below:

Column 3, Line 4: delete "14.," and substitute --14',--

Column 4, Line 31: delete "45',-long" and substitute --45'-long--

Column 5, Line 33: delete "14'," and substitute --14'--

Column 5, Line 35: delete "14'." and substitute --14'--

Column 5, Line 35: delete "80" and substitute --80--

Column 6, Line 24: delete "tail lend" and substitute --tail end--

Column 6, Line 26: delete "tail lend" and substitute --tail end--

Signed and Sealed this

Twenty-fifth Day of July, 1989

Attest:

DONALD J. QUIGG

Attesting Officer

Commissioner of Patents and Trademarks